(12) United States Patent
Kato et al.

(10) Patent No.: US 11,100,378 B2
(45) Date of Patent: Aug. 24, 2021

(54) PACKAGING PAPERBOARD AND METHOD FOR MANUFACTURING SAME

(71) Applicant: Murata Manufacturing Co., Ltd., Nagaokakyo (JP)

(72) Inventors: Noboru Kato, Nagaokakyo (JP); Teppei Miura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/693,590

(22) Filed: Nov. 25, 2019

(65) Prior Publication Data

US 2020/0097785 A1 Mar. 26, 2020

Related U.S. Application Data

(63) Continuation of application No. PCT/JP2018/019643, filed on May 22, 2018.

(30) Foreign Application Priority Data

May 26, 2017 (JP) .............................. JP2017-104990

(51) Int. Cl.
| | | |
|---|---|---|
| *G06K 19/02* | (2006.01) | |
| *G06K 19/077* | (2006.01) | |
| *B65D 5/42* | (2006.01) | |
| *B65D 65/40* | (2006.01) | |
| *H01Q 1/22* | (2006.01) | |
| *H01Q 1/38* | (2006.01) | |

(52) U.S. Cl.
CPC ......... *G06K 19/025* (2013.01); *B65D 5/4216* (2013.01); *B65D 65/40* (2013.01); *G06K 19/07773* (2013.01); *H01Q 1/2225* (2013.01); *H01Q 1/2283* (2013.01); *H01Q 1/38* (2013.01)

(58) Field of Classification Search
CPC ........ G06K 19/00; G06K 19/04; G06K 19/06; G06K 19/07
USPC ................................ 235/492, 375, 487, 380
See application file for complete search history.

(56) References Cited

U.S. PATENT DOCUMENTS

| | | | |
|---|---|---|---|
| 7,518,558 B2 | 4/2009 | Kato et al. | |
| 2005/0130389 A1* | 6/2005 | Yamazaki | ........... H01L 27/1214 438/455 |
| 2006/0290513 A1* | 12/2006 | Shanton | ........... G06K 19/07749 340/572.7 |
| 2007/0176845 A1* | 8/2007 | Yamazaki | ........ G06K 19/07728 343/895 |

(Continued)

FOREIGN PATENT DOCUMENTS

| | | |
|---|---|---|
| JP | 2002352206 A | 12/2002 |
| JP | 2004318571 A | 11/2004 |

(Continued)

OTHER PUBLICATIONS

International Search Report issued in PCT/JP2018/019643, dated Jul. 3, 2018.

(Continued)

*Primary Examiner* — Edwyn Labaze
(74) *Attorney, Agent, or Firm* — Arent Fox LLP

(57) ABSTRACT

A packaging paperboard is provided that includes two or more layers with an antenna pattern printed on one layer of the two or more layers, and an RFIC element adhered to the other layer of the two or more layers. In a laminate having the layers stuck together, the RFIC element and the antenna pattern are interposed between the layers to configure an RFIC device in which the RFIC element and the antenna pattern are electrically connected.

14 Claims, 11 Drawing Sheets

(56) References Cited

U.S. PATENT DOCUMENTS

| | | | |
|---|---|---|---|
| 2008/0029417 A1* | 2/2008 | Begim | B65D 75/36 |
| | | | 206/461 |
| 2008/0143630 A1 | 6/2008 | Kato et al. | |
| 2008/0191174 A1* | 8/2008 | Ehrensvard | H05K 3/323 |
| | | | 252/500 |
| 2009/0096583 A1* | 4/2009 | Kanda | G06K 19/07749 |
| | | | 340/10.1 |
| 2011/0001608 A1* | 1/2011 | Baba | G06K 19/07749 |
| | | | 340/10.1 |
| 2015/0147544 A1* | 5/2015 | Minsky | B32B 27/36 |
| | | | 428/215 |
| 2015/0248604 A1* | 9/2015 | Diorio | H01L 24/95 |
| | | | 235/488 |
| 2019/0280394 A1* | 9/2019 | Cheng | H01Q 15/14 |
| 2020/0249109 A1* | 8/2020 | Singleton | G01L 9/00 |

FOREIGN PATENT DOCUMENTS

| | | |
|---|---|---|
| JP | 2005326919 A | 11/2005 |
| JP | 2008160874 A | 7/2008 |
| JP | 2013145450 A | 7/2013 |
| JP | 2016012254 A | 1/2016 |
| JP | 5904316 B1 | 4/2016 |

OTHER PUBLICATIONS

Written Opinion of the International Searching Authority issued in PCT/JP2018/019643, dated Jul. 3, 2018.

* cited by examiner

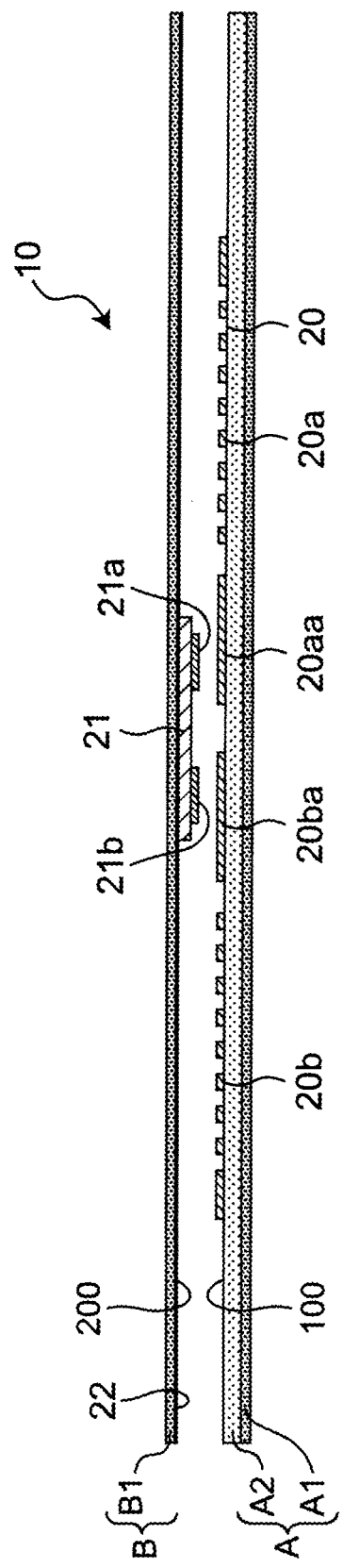

PACKAGING PAPERBOARD AND METHOD FOR MANUFACTURING SAME

CROSS REFERENCE TO RELATED APPLICATIONS

The present application is a continuation of PCT/JP2018/019643 filed May 22, 2018, which claims priority to Japanese Patent Application No. 2017-104990, filed May 26, 2017, the entire contents of each of which are incorporated herein by reference.

TECHNICAL FIELD

The present invention relates to a packaging paperboard used as assembling materials for packages, such as boxes, paper containers, and the like, for accommodating articles and a method for manufacturing the packaging paperboard. More particularly, the invention relates to a packaging paperboard including a wireless communication device that utilizes a radio frequency identification (RFID) technology performing the near-field communication for read/write of semiconductor memory data in a non-contact manner and a method for manufacturing the same.

BACKGROUND

In recent years, at the time of handling such as selling and storing various types of products, an "RFID tag", i.e., a wireless communication device, is attached to various products in order to improve the efficiency of product management. The "RFID tag" has an integrated configuration where a radio frequency integrated circuit (RFIC) element with a built-in RFIC chip is mounted on a base film having a metal film antenna pattern formed thereon (see, e.g. Patent Document 1; identified below). Such an "RFID tag" is attached to each of the various types of products to perform the product management for the products.

Patent Document 1: Japanese Patent No. 5904316.

The "RFID tag" as described in Patent Document 1 can be, for example, individually attached in use to packages, such as boxes, paper containers and the like, for example, for accommodating articles. In this way, the "RFID tag" is configured such that it is individually attached to each product to acquire information on each product for product management. Therefore, the manufacturing cost of the "RFID tag" is reflected directly in the product price. Thus, reducing the manufacturing cost of the "RFID tag" is an important issue in the product cost reduction, and controlling the manufacturing cost of the "RFID tag" as low as possible is an important issue to be solved for the spread of the product management with the wireless communication device.

Efforts to reduce manufacturing cost are limited, however, by taking into account the configuration of the "RFID" tag where the antenna pattern is formed on the base film and where the RFIC element with the built-in RFIC chip is mounted on the antenna-pattern-formed base film.

SUMMARY OF THE INVENTION

Accordingly, to reduce manufacturing cost over the entire product, the present invention provides a configuration of previously imparting an RFID function (an RFID device) implemented by the RFIC element and the antenna pattern to the paperboard itself in the form of, for example, the package (paper box, paper container, etc.) for accommodating articles, and by putting the product in the package manufactured from such a paperboard.

According to an exemplary aspect, a package and a packaging paperboard are provided having an RFID function with excellent communication properties, as well as a method is provided for manufacturing such a packaging paperboard having the RFID function in a simple manner.

In order to achieve the above noted object, a method for manufacturing a packaging paperboard according to an exemplary aspect is provided that includes manufacturing a packaging paperboard with at least two layers. In this aspect, the method includes printing a plurality of antenna patterns on one layer of the at least two layers at a predetermined interval; adhering a plurality of RFIC elements to the other layer of the at least two layers at a predetermined interval; and electrically connecting the RFIC elements and the antenna patterns by sticking the one layer and the other layer together such that the RFIC elements and the antenna patterns are interposed between the one layer and the other layer.

In another exemplary aspect, a packaging paperboard is provided that includes at least two layers, wherein one layer of the at least two layers includes an antenna pattern printed thereon, wherein the other layer of the at least two layers includes an RFIC element adhered thereto, and wherein in a laminate having the one layer and the other layer stuck together. Moreover, the RFIC element and the antenna pattern are interposed between the one layer and the other layer to configure an RFIC device in which the RFIC element and the antenna pattern are electrically connected.

A package according to an exemplary aspect is assembled with a plurality of fold parts to contain articles, wherein the package is configured from a packaging paperboard having at least two layers, wherein one layer of the at least two layers includes an antenna pattern printed thereon, wherein the other layer of the at least two layers includes an RFIC element adhered thereto, wherein the package comprises a laminate in which the one layer and the other layer are stuck together, and wherein the laminate comprises an RFIC device in which the RFIC element and the antenna pattern are interposed between the one layer and the other layer so that the RFIC element and the antenna pattern are electrically connected.

According to the exemplary embodiments of the present invention, a package and a packaging paperboard are provided having the RFID function with excellent communication properties and a manufacturing method is provided for a packaging paperboard having the RFID function in a simple manner.

BRIEF DESCRIPTION OF DRAWINGS

FIG. 6 is a sectional view showing the packaging paperboard manufactured by the manufacturing method of the packaging paperboard of the first embodiment.

DETAILED DESCRIPTION

Figure 1:
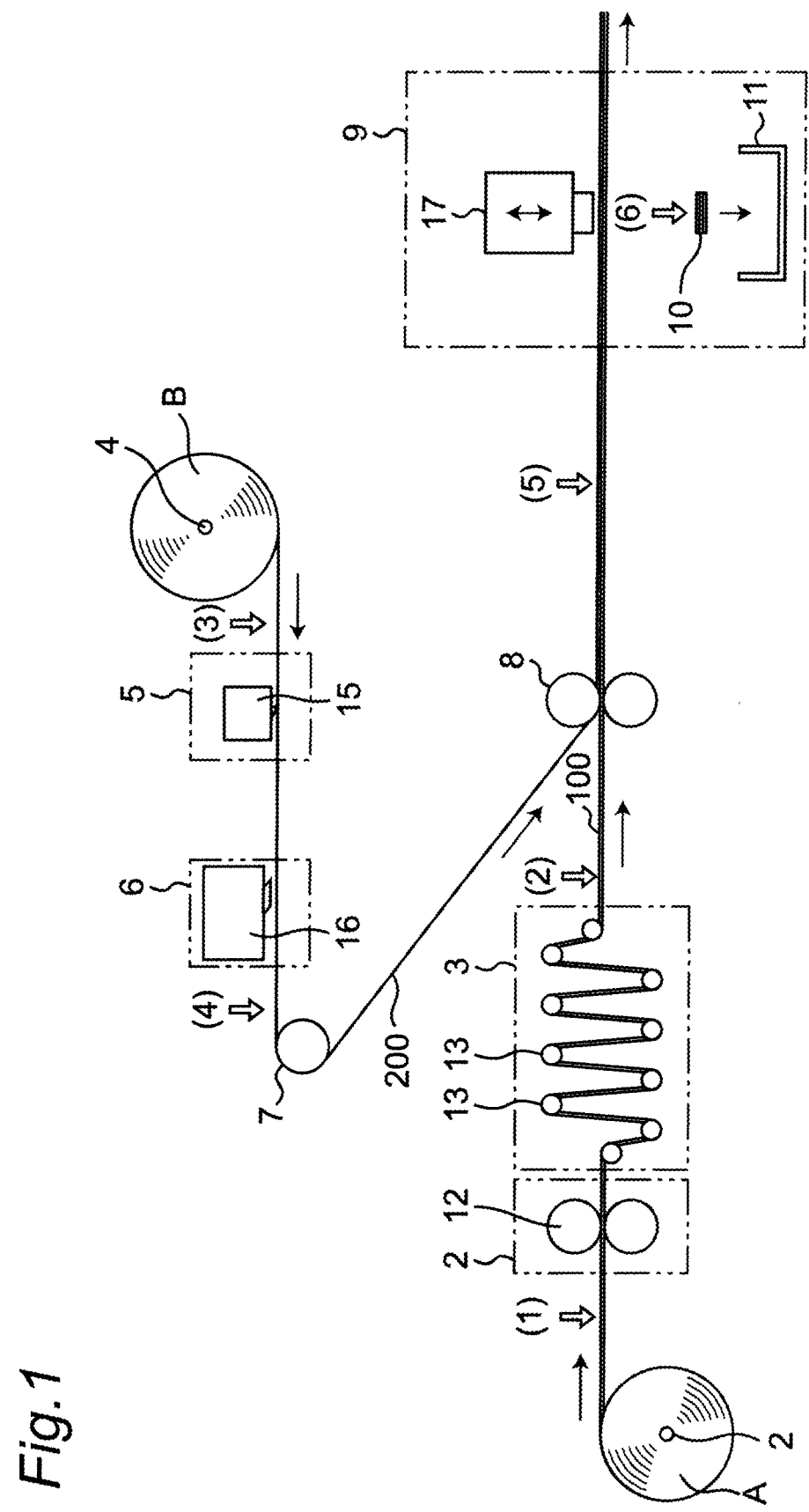
FIG. 1 is a process view schematically showing steps of a manufacturing method of a packaging paperboard of a first exemplary embodiment according to the present invention.

A first description is provided for exemplary configurations of various aspects of a packaging paperboard manufacturing method, a packaging paperboard, and a package according to the present invention.

In an exemplary aspect, a method for manufacturing a packaging paperboard including at least two layers is provided that includes printing a plurality of antenna patterns on one layer of the at least two layers at a predetermined interval; adhering a plurality of RFIC elements to the other layer of the at least two layers at a predetermined interval; and electrically connecting the RFIC elements and the antenna patterns by sticking the one layer and the other layer together such that the RFIC elements and the antenna patterns are interposed between the one layer and the other layer.

According to the packing paperboard manufacturing method of the first exemplary aspect described above, a packaging paperboard can be manufactured having an RFID function with excellent communication properties in a simple manner.

Moreover, a method for manufacturing a packaging paperboard according to the second exemplary aspect of the present invention is provided. In the first aspect of the method, wherein the printing the antenna patterns may include continuously printing the antenna patterns on a first sheet at a predetermined interval, the first sheet configuring the one layer and being continuously fed from a first supply reel around which the first sheet is wound, the adhering the RFIC elements may include continuously adhering the plurality of RFIC elements at a predetermined interval on a second sheet coated with an adhesive, the second sheet configuring the other layer and being continuously fed from a second supply reel around which the second sheet is wound, and the electrically connecting the RFIC elements and the antenna patterns may include a step at which the first sheet having the antenna patterns printed thereon and the second sheet having the RFIC elements adhered thereto are continuously fed and are stuck together to electrically connect the RFIC elements and the antenna patterns.

Yet further, a method of manufacturing a packaging paperboard according to the third exemplary aspect of the present invention is provided wherein, in the second aspect, the antenna pattern may include an antenna part sending and receiving radio waves and a land part to which the RFIC element is electrically connected, and the land part may have a shape with a longitudinal direction parallel to a transport direction in which the first sheet and the second sheet are stuck together.

According to another exemplary aspect, a packaging paperboard including at least two layers is provided that includes an antenna pattern printed on one layer of the at least two layers, and an RFIC element adhered to the other layer of the at least two layers, wherein in a laminate having the one layer and the other layer stuck together, the RFIC element and the antenna pattern are interposed between the one layer and the other layer to configure an RFIC device in which the RFIC element and the antenna pattern are electrically connected.

According to the exemplary aspect, the packaging paperboard is provided having an RFID function with excellent communication properties, as well as results in a paperboard having a high market value and high versatility as a paper container accommodating articles and sold as a product.

According to another exemplary aspect, for the exemplary packaging paperboard, the antenna pattern may include an antenna part sending and receiving radio waves and a land part to which the RFIC element is electrically connected, and the land part may include two input/output terminals electrically connected to the RFIC element, the two input/output terminals having respective shapes larger than the RFIC element and having shapes that have respective longitudinal directions parallel to each other and that are disposed facing each other.

According to another exemplary aspect, a package assembled with a plurality of fold parts to contain articles is provided, wherein the package is configured from a packaging paperboard having at least two layers, one layer of the at least two layers includes an antenna pattern printed thereon, and the other layer of the at least two layers includes an RFIC element adhered thereto. Moreover, the package comprises a laminate in which the one layer and the other layer are stuck together, and the laminate comprises an RFIC device in which the RFIC element and the antenna pattern are interposed between the one layer and the other layer so that the RFIC element and the antenna pattern are electrically connected. Connecting electrically herein includes not only the DC connection but also the cases of connecting via capacitance or by electromagnetic-field coupling.

According to the exemplary aspect, the package is provided having an RFID function with excellent communication properties, as well as results in a package having a high market value and high versatility as a container accommodating articles and sold as a product.

According to another exemplary aspect, the antenna pattern may include an antenna part sending and receiving radio waves and a land part to which the RFIC element is electrically connected, and the land part may include two input/output terminals electrically connected to the RFIC element, the two input/output terminals having respective shapes larger than the RFIC element and having shapes that have respective longitudinal directions parallel to each other and that are disposed facing each other.

According to another exemplary aspect, the RFIC device configured from the RFIC element and the antenna pattern may be disposed on a surface not including the fold part and may be disposed in a vicinity of the fold part from which contained articles are apart by a predetermined distance.

Hereinafter, exemplary embodiments referring to the drawings are described for a packaging paperboard manufacturing method, a packaging paperboard, and a package according to the present invention. The packaging paperboard and the package of the exemplary embodiments of the present invention are configured from laminated paper formed from a plurality of sheets of paper and/or resin films stuck together, and the packaging paperboard is cut and folded to a desired shape to become the package accommodating articles. Moreover, the packaging paperboard of the present invention has a configuration having an RFID function and enabling communication in a non-contact system utilizing a magnetic field and an electromagnetic field, so that examples of a paper material do not include materials blocking the magnetic field and the electromagnetic field but include packaging materials other than such materials.

First Exemplary Embodiment

FIG. 1 is a process view schematically showing steps of a manufacturing method of a packaging paperboard 10 of a first exemplary embodiment according to the present invention. In the manufacturing method of the packaging paperboard 10, a first sheet A as a first base is wound and held around a first supply reel 1, while a second sheet B as a second base is wound and held on a second supply reel 4. In the first embodiment, the first sheet A and the second sheet B held on the first supply reel 1 and the second supply reel 4 are each a paperboard, which can be a multi-layer paperboard and a single-layer paperboard, for example.

Although the manufacturing method of the packaging paperboard 10 of the first embodiment is described with an example of manufacturing the packaging paperboard 10 using a laminate where the first sheet A as the first base and the second sheet B as the second base are stuck together, it is noted that the present invention is not limited to a two-layered laminate of the first sheet A and the second sheet B, and the present invention is directed to a packaging paperboard including at least two layers.

The first sheet A held on the first supply reel 1 is first fed to a printing step 2 at a predetermined speed, and an antenna pattern 20 is continuously printed in sequence at predetermined positions having a given interval previously defined on the first sheet A. Although the printing step 2 of the first embodiment is described with an example of printing the antenna pattern 20 with a gravure printing using a gravure roll 12, it is noted that the present invention is not limited to a gravure printing as printing means at the printing step 2 but can be other printing means. It is also possible to print a conductive paste in the form of a desired antenna pattern 20 with the use of a screen printing, an ink jet printing, and the like. Moreover, examples of the conductive paste include a metal paste containing silver and/or copper as conductive metal, or an organic conductive paste, which is made of a material drying and curable at a low temperature.

The first sheet A having the antenna pattern 20 printed at a predetermined position is fed to a drying step 3. In the drying process 3, the conductive paste forming the antenna pattern 20 is dried and cured to make the antenna pattern 20 fixed on the first sheet A. In the description of the first embodiment, a surface of the first sheet A having the antenna pattern 20 fixed thereon is an antenna-pattern-forming surface 100 of the first sheet A.

Although the drying step 3 shown in FIG. 3 is described with a configuration where a plurality of rolls 13 are disposed in a temperature control chamber to draw the first sheet A, in the case of using a light sintering apparatus as drying technique at the drying step 3, the conductive paste is instantaneously dried and cured, so that there is no need for the configuration where the first sheet A is drew around, making it possible to achieve the minimization of the manufacturing device.

In the packaging paperboard 10 of the first embodiment, a surface opposed to the antenna-pattern-forming surface 100 of the first sheet A is a front side. The front side has various pieces of information printed thereon such as a product name related to products for which the packaging paperboard 10 is used.

In the manufacturing method of the packaging paperboard 10 of the first embodiment, a step including the printing step 2 and the drying step 3 effected on the above first sheet A is a step at which a plurality of antenna patterns are printed on at least one of two layers at a predetermined interval in the manufacturing method of the present invention.

On the other hand, the second sheet B held on the second supply reel 4 is first fed to an adhesive applying step 5 continuously at a predetermined speed. In the adhesive applying step 5, an adhesive applying device 15 applies an adhesive entirely onto one principal surface of the second sheet B. A surface opposite to the one principal surface (e.g., a sticking surface 200) of the second sheet B to which the adhesive applying device applies the adhesive is a back side of the packaging paperboard 10.

Although in the packaging paper board 10 of the first embodiment, the opposite surface to the antenna-pattern-forming surface 100 of the first sheet A is described as the front side of the packaging paperboard 10 and the opposite surface to the sticking surface 200 of the second sheet B is described as the back side of the packaging paperboard 10, it should be appreciated that the front and back sides of the packaging paperboard 10 may be reversed.

As further shown, the second sheet B having the adhesive applied thereon at the adhesive applying step 5 is fed to an RFIC element supplying step 6 as the next step while keeping the predetermined speed. In the RFIC element supplying step 6, an RFIC element 21 is supplied to the sticking surface 200 of the second sheet B in sequence at a predetermined interval by an RFIC supply device 16 holding a multiplicity of the RFIC elements 21 in line. At this time, the RFIC elements 21 supplied in sequence to the sticking surface 200 are arranged and adhered at a predetermined position in a predetermined orientation on the sticking surface 200. At this time, the RFIC elements 21 on the sticking surface 200 of the second sheet B each have two input/output terminal electrodes (21a, 21b) protruding upwardly.

In the manufacturing method of packaging paperboard 10 of the first embodiment, a step including the above adhesive applying step 5 and RFIC element supplying step 6 is a step of adhering a plurality of RFIC elements to at least the other of two layers at a predetermined interval in the manufacturing method of the present disclosure.

As described above, the first sheet A having the antenna pattern 20 formed thereon and the second sheet B having the RFIC element 21 adhered thereto are fed to pressure rolls 8 at the same speed to be stuck together. At this time, the input/output terminal electrodes (21a, 21b) of the RFIC element 21 of the second sheet B are connected respectively to land parts (a first input/output terminal 20aa, a second input/output terminal 20ba) formed on the antenna pattern of the first sheet A such that the overall surfaces (except a region occupied by the RFIC element 21) are stuck together.

In the manufacturing method of the packaging paperboard 10 of the first embodiment, the above sticking step at where pressure rolls 8 stick the first sheet A and the second sheet B together is a step of electrically connecting the RFIC element and the antenna pattern in the manufacturing method of the present invention. In this specification, electrically connecting includes not only the DC connection but also the cases of connecting via capacitance or through electromagnetic-field coupling.

Moreover, as shown in FIG. 1, the paperboard (i.e., a third sheet (A+B)) having the first sheet A and the second sheet B stuck together is fed to a punching step 9 to be punched into a desired shape (e.g., the packaging paperboard 10) by a punching device 17. The packaging paperboard 10 punched by the punching device 17 is housed in a storage box 11.

Figure 2:
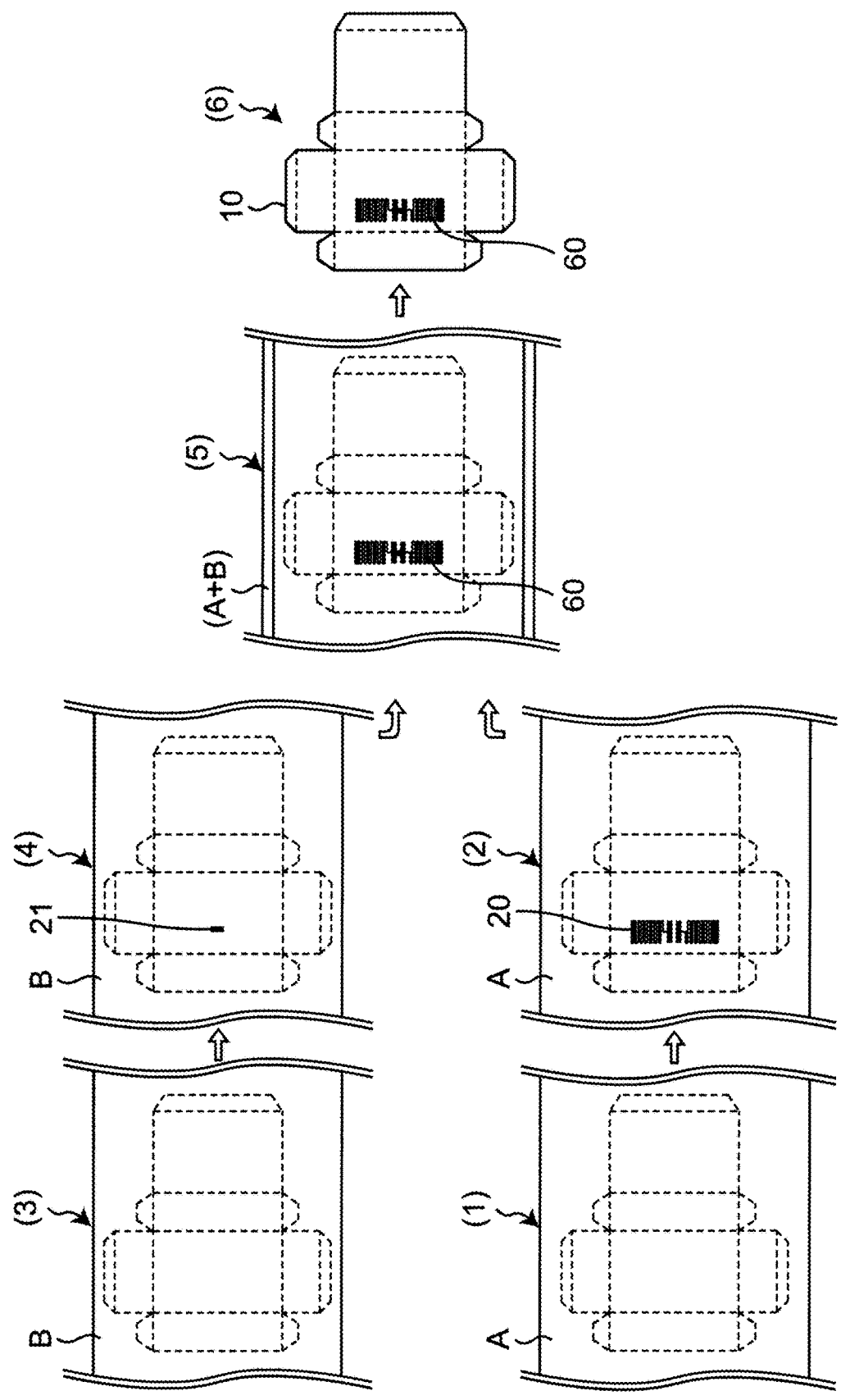
FIG. 2 is a view showing the states of a specific paperboard manufactured at the steps in the manufacturing method of the packaging paperboard of the first exemplary embodiment shown in FIG. 1.

FIG. 2 is a view showing an example of the states of a specific paperboard (the first sheet A, the second sheet B, the third sheet (A+B), and the packaging paperboard 10) manufactured at the steps in the manufacturing method of the first embodiment shown in FIG. 1. In the paperboard shown in FIG. 2, positions and fold portions (i.e., fold lines) of the packaging paperboard 10 to be punched are indicated by broken lines for convenience. Although each paperboard of FIG. 2 shows only regions each becoming one packaging paperboard, the first sheet A and the second sheet B have regions becoming a plurality of packaging paperboards 10 continuously arranged at a predetermined interval. In the first embodiment, a plurality of regions becoming a plurality of packaging paperboards 10 are juxtaposed parallel or orthogonal to a paperboard transport direction T at a predetermined interval.

The paperboard designated at (1) in FIG. 2 represents the first sheet A immediately after being fed out from the first supply reel 1 and is the paperboard in a region indicated by an arrow of reference numeral (1) of FIG. 1. The paperboard designated at (2) in FIG. 2 represents the first sheet A in a state where the antenna pattern 20 is printed, dried, and cured at a predetermined position. The paperboard designated at (2) in FIG. 2 is the paperboard in a region indicated by an arrow of reference numeral (2) of FIG. 1.

The paperboard designated at (3) in FIG. 2 represents the second sheet B immediately after being fed out from the second supply reel 4 and is the paperboard in a region indicated by an arrow of reference numeral (3) of FIG. 1. The paperboard designated at (4) in FIG. 2 represents the second sheet B with the RFIC element 21 adhered at a predetermined position by an adhesive applied thereon. The paperboard designated at (4) in FIG. 2 is the paperboard in a region indicated by an arrow of reference numeral (4) of FIG. 1.

The paperboard designated at (5) in FIG. 2 is the third sheet (i.e., A+B) in a state where the first sheet A designated at (2) in FIG. 2 and the second sheet B designated at (4) in FIG. 2 are pressed and stuck together. At this time, an RFIC device 60 is formed by securely electrically connecting the input/output terminal electrodes (21a, 21b) of the RFIC element 21 of the second sheet B to the two land parts (20aa, 20ba) of the antenna pattern 20 of the first sheet A. The paperboard of (5) in FIG. 2 is the paperboard in a region indicated by an arrow of reference numeral (5) of FIG. 1. The paperboard designated at (6) in FIG. 2 is the packaging paperboard 10 punched into a desired shape by the punching device 17. The packaging paperboard 10 punched by the punching device 17 is housed in the storage box 11 (see (6) of FIG. 1).

It is noted that although the first exemplary embodiment is described with a configuration example where one RFIC device 60 is disposed for one packaging paperboard 10, the present invention is not limited to such a configuration. For example, one packaging paperboard 10 may include a plurality of RFIC devices 60 having a plurality of antenna patterns 20 whose respective radiation directions are different. In particular, a package having a more excellent RFIC function is obtained by disposing two RFIC devices 60 at positions with different directivities in the assembled package.

[Exemplary Antenna Pattern Shape]

Figure 3A:
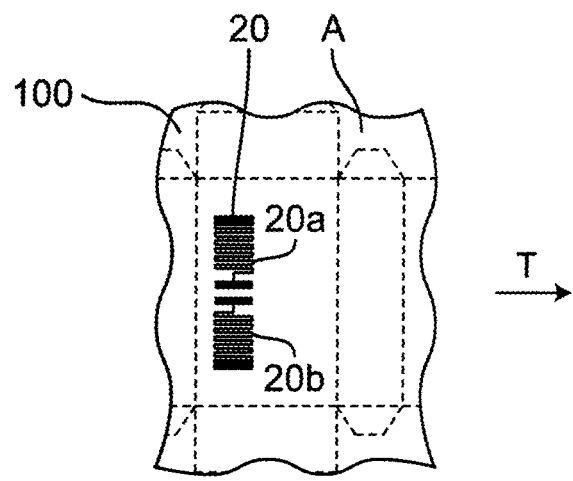
FIG. 3(a) shows a view of an antenna pattern printed on an antenna-pattern-forming surface of a first sheet in a packaging paperboard of a first embodiment.
Figure 3B:
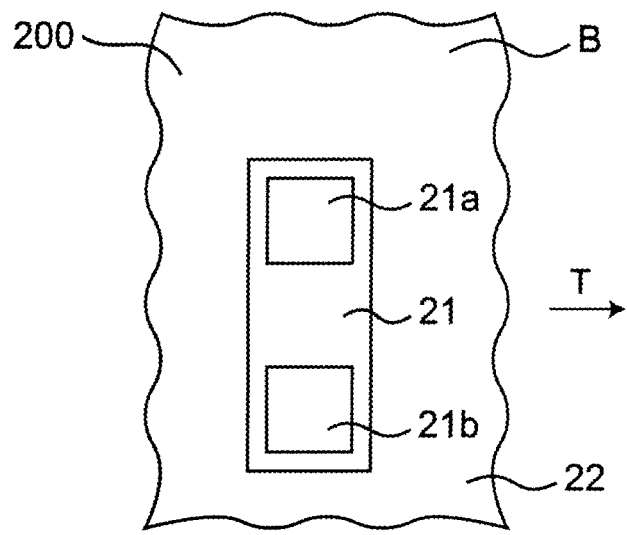
FIG. 3(b) show a view of an RFIC element adhered to a sticking surface of a second sheet in the packaging paperboard of the first embodiment.

FIG. 3(a) shows the antenna pattern 20 printed on the antenna-pattern-forming surface 100 of the first sheet A at a predetermined position. FIG. 3(b) shows the RFIC element 21 adhered to the sticking surface 200 of the second sheet B at a predetermined position. The RFIC element 21 shown in FIG. 3(b) is subminiature and is in the shape of, for example, a rectangle with one side of several millimeters, so that it is drawn to a larger scale than the antenna pattern 20 shown in FIG. 3(a).

Figure 3C:
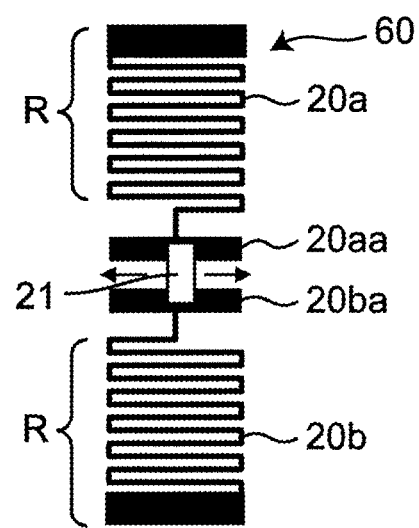
FIG. 3(c) a view of an RFIC device in a third sheet composed of the first and the second sheet stuck together.

FIG. 3(c) is a view showing the RFIC device 60 configured to connect the RFIC element 21 to the antenna pattern 20 on the third sheet (i.e., A+B) with the first sheet A and the second sheet B stuck together. The RFIC element 21 shown in FIG. 3(c) represents a state where the front and back of the RFIC element 21 shown in FIG. 3(b) is reversed.

The antenna pattern 20 printed on the first sheet A includes, for example, meandered antenna conductors 20a and 20b acting as dipole antennas. The first input/output terminal 20aa (i.e., the land part) as one end of the first antenna conductor 20a and the second input/output terminal 20ba (i.e., the land part) as one end of the second antenna conductor 20b are arranged facing each other at a predetermined interval. As shown in FIG. 3(c), the first antenna conductor 20a and the second antenna conductor 20b of the antenna pattern 20 each have a meandered antenna part R configured to send and receive radio waves, and respectively have the land parts (i.e., the first input/output terminal 20aa and the second input/output terminal 20ba) to which the RFIC element 21 is electrically connected.

In an exemplary aspect, the antenna pattern 20 is made of a conductive metal in the form of a metal paste containing silver and/or copper and of an organic conductive paste. The land parts (the first input/output terminal 20aa, the second input/output terminal 20ba) have a rectangular shape (e.g., a belt shape) whose longitudinal direction is parallel to the transport direction T at the time of the first sheet A and the second sheet B being stuck together. The land parts (the first input/output terminal 20aa, the second input/output terminal 20ba) have a preset predetermined longitudinal length and has a rectangular shape at least larger than the RFIC element. The shape of land parts is not specified to the rectangular shape but may be any shape whose longitudinal direction is parallel to the transport direction T.

In the second sheet B, an adhesion layer 22 is formed on the sticking surface 200 that is one principal surface stuck to the first sheet A, with the RFIC element 21 being adhered onto the adhesion layer 22. The adhesion layer 22 is made of, for example, an acrylic material having strong adhesiveness for adherence to the first sheet A. The RFIC element 21 is, for example, a package or a strap having RFIC chips sealed therein. The RFIC element 21 is an RFIC element covering 900 MHz band, for example, UHF band communication frequencies.

As shown in FIG. 3(b), the RFIC element 21 is adhered to the sticking surface 200 of the second sheet B at a predetermined position, with its input/output terminal electrodes 21a, 21b exposed. The distance between the first input/output terminal 20aa and the second input/output terminal 20ba as two land parts facing each other of the antenna pattern 20 corresponds to the distance between the two terminal electrodes, i.e., the first input/output terminal electrode 21a and the second input/output terminal electrode 21b of the RFIC element 21, the respective ones being arranged for electrical connection. Thus, as shown in FIG. 3(c), when the first sheet A and the second sheet B are stuck together, the first input/output terminal electrode 21a of the RFIC element 21 is securely connected to the first input/output terminal 20aa of the first antenna conductor 20a, while the second input/output terminal electrode 21b is securely connected to the second input/output terminal 20ba of the second antenna conductor 20b, as shown in FIG. 3(c), for example.

As shown in FIGS. 3(a) and 3(b), in the antenna pattern 20 formed on the first sheet A, the first input/output terminal 20aa as one end of the first antenna conductor 20a and the second input/output terminal 20ba as one end of the second antenna conductor 20b have such a shape (e.g., a band shape) that the transport direction T at the time of the first sheet A and the second sheet B being stuck together is the longitudinal direction. In this manner, the first input/output terminal 20aa and the second input/output terminal 20ba have the shape (e.g., the band shape) with the longitudinal direction, which is the transport direction T at the time of the first sheet A and the second sheet B being stuck together. Thus, even if the RFIC element 21 of the second sheet B has a misalignment in the transport direction T relative to the antenna pattern 20 of the first sheet A, the first input/output terminal electrode 21a of the RFIC element 21 remains securely connected to the first input/output terminal 20aa of the first antenna conductor 20a and the second input/output terminal electrode 21b remains securely connected to the second input/output terminal 20ba of the second antenna conductor 20b.

It is noted that in the manufacturing method of the packaging paperboard, the misalignment of several millimeters to several tens of millimeters may occur in the transport direction T when sticking together the first sheet A and the second sheet B continuously fed. Irrespective of the occurrence of such a misalignment, the packaging paperboard manufacturing method of the first embodiment ensures a secure electrical connection of the RFIC element 21 to the antenna pattern 20 as described above, to manufacture the packaging paperboard. Moreover, in the width direction orthogonal to the transport direction T, any large misalignment does not occur since the width positions of the sheet are regulated in the steps.

Although, at this time, the first input/output terminal electrode 21a and the first input/output terminal 20aa are electrically directly connected and the second input/output terminal electrode 21b and the second input/output terminal 20ba are electrically directly connected, the respective ones are not fixedly stuck to each other. Thus, the configuration is such that, even if the first sheet A and the second sheet B bend, stresses are prevented from concentrating on connection portions due to sliding connection portions between the first input/output terminal electrode 21a and the first input/output terminal 20aa and between the second input/output terminal electrode 21b and the second input/output terminal 20ba. Accordingly, a high reliability is assured at connection portions between the antenna pattern 20 and the RFIC element 21.

Although the first antenna conductor 20a and the second antenna conductor 20b are described with the meandering configuration in the first embodiment, it is noted that the exemplary embodiments of the present invention is not limited to such a configuration. The first antenna conductor 20a and the second antenna conductor 20b may have any shape configured to function as an antenna whether or not the configuration is, for example, a rectangular shape or the other shapes. Although the first antenna conductor 20a and the second antenna conductor 20b are described with the configuration acting as a dipole antenna in the first embodiment, the present invention is not limited to such a configuration. For example, the first antenna 20a and the second antenna 20b may act as a continuous loop-type antenna or as the other types of antennas. With electrical connections by capacitance between the first input/output terminal electrode 21a and the first input/output terminal 20aa and between the second input/output terminal electrode 21b and the second input/output terminal 20ba, the sliding connection portions may have a configuration where stresses are prevented from concentrating on the connection portions.

[Exemplary Configuration of RFIC Element]

Figure 4:
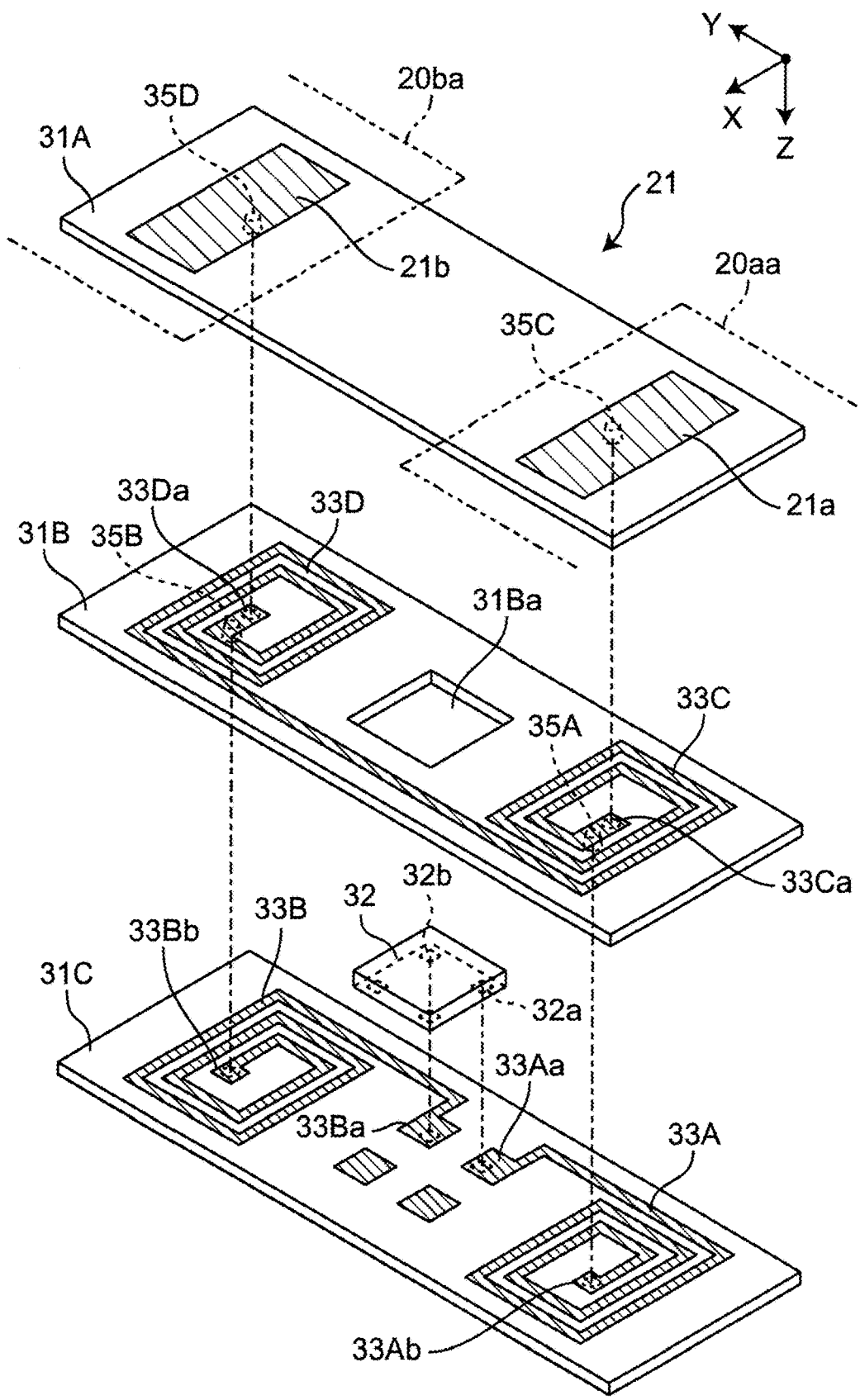
FIG. 4 is an exploded perspective view showing an example of the RFIC element in the packaging paperboard of the first embodiment.

FIG. 4 is an exploded perspective view showing an example of the configuration of the RFIC element. The RFIC element 21 shown in FIG. 4 is the RFIC element in the state shown in FIG. 3(b) with the first input/output terminal electrode 21a and the second input/output terminal electrode 21b exposed on the upper surface. In an X-Y-Z coordinate system of FIG. 4, a Z-axis of the RFIC element 21 represents the thickness direction. The X-Y-Z coordinate system facilitates understanding the invention and does not limit the present invention.

As shown in FIG. 4, the RFIC element 21 is configured from a multi-layered board having three layers. Specifically, the RFIC element 21 can be made from a resin material such as polyimide or liquid crystal polymer with the configuration of laminating a plurality of flexible insulation sheets 31A, 31B, and 31C. The number of laminated base layers in the multi-layered board is appropriately adjustable depending on a required inductance value, etc.

The RFIC element 21 has an RFIC chip 32, a plurality of inductance elements 33A, 33B, 33C, and 33D, and the input/output terminal electrodes (the first input/output terminal electrode 21a, the second input/output terminal electrode 21b) as external connection terminals. In the first embodiment, the inductance elements 33A, 33B, 33C, and 33D and the input/output terminal electrodes (the first input/output terminal electrode 21a, the second input/output terminal electrode 21b) are formed on the insulation sheets 31A, 31B, and 31C and are made of conductive materials such as copper.

The RFIC chip 32 is mounted on the third insulation sheet 31C at a center in the longitudinal direction (i.e., a Y-axis direction) thereof. It is noted that the RFIC chip 32 has a configuration where various types of elements are built in a semiconductor substrate made of a semiconductor such as silicon. The RFIC chip 32 includes a first terminal 32a and a second terminal 32b.

The first inductance element 33A formed on the third insulation sheet 31C is formed on one side in the longitudinal direction (i.e., the Y-axis direction) of the third insulation sheet 31C and is configured from a conductor pattern with a spiral coil form. The first inductance element 33A has at its one end (i.e., an exterior end of the coil) a chip-side land 33Aa connected to the first terminal 32a of the RFIC chip 32. A terminal-side land 33Ab is disposed on the inductance element 33A at the other end (i.e., a central end of the coil) thereof.

The second inductance element 33B formed on the third insulation sheet 31C is formed on the other side in the longitudinal direction (i.e., the Y-axis direction) of the third insulation sheet 31C and is configured from the conductor pattern with the spiral coil form. The second inductance element 33B has at its one end (i.e., the exterior end of the coil) a chip-side land 33Ba connected to the second terminal 32b of the RFIC chip 32. A terminal-side land 33Bb is disposed on the second inductance element 33B at the other end (i.e., the central end of the coil) thereof.

The third inductance element 33C formed on the second insulation sheet 31B is formed on one side in the longitudinal direction (i.e., the Y-axis direction) of the second insulation sheet 31B, and is configured from the conductor pattern with the spiral coil form. The third inductance element 33C is arranged facing the first inductance element 33A in a laminating direction (i.e., a Z-axis direction). A terminal-side land 33Ca is disposed on the third inductance element 33C at one end (i.e., the central end of the coil) thereof. The terminal-side land 33Ca is connected to the terminal-side land 33Ab of the first inductance element 33A on the third insulation sheet 31C via a first interlayer connection conductor 35A such as a through hole conductor passing through the second insulation sheet 31B.

The fourth inductance element 33D formed on the second insulation sheet 31B is formed on the other side in the longitudinal direction (i.e., the Y-axis) of the second insulation sheet 31B and is configured from the conductor pattern with the spiral coil shape. The fourth inductance element 33D is arranged facing the second inductance element 33B in the laminating direction (i.e., the Z-axis direction). A terminal-side land 33Da is disposed on the fourth inductance element 33D at one end (i.e., the central end of the coil) thereof. The terminal-side land 33Da is connected to the terminal-side land 33Bb of the second inductance element 33B on the third insulation sheet 31C via a second interlayer connection conductor 35B such as the through hole conductor passing through the second insulation sheet 31B.

According to the exemplary aspect, the third and the fourth inductance elements 33C and 33D formed on the second insulation sheet 31B are integrated as one conductor pattern. That is, the respective other ends (i.e., the exterior ends of the coil) are connected. The second insulation sheet 31B has a through hole 31Ba accommodating the RFIC chip 32 mounted on the third insulation sheet 31C.

The first and the second input/output terminal electrodes 21a and 21b as external connection terminals are configured from conductor patterns disposed on the first insulation sheet 31A. The first and the second input/output terminal electrodes 21a and 21b are arranged facing each other in the longitudinal direction (i.e., the Y-axis direction) of the first insulation sheet 31A.

The first input/output terminal electrode 21a is connected to the terminal-side land 33Ca of the third inductance element 33C on the second insulation sheet 31B via a third interlayer connection conductor 35C such as the through hole conductor passing through the first insulation sheet 31A. The first input/output terminal electrode 21a is connected to the first input/output terminal 20aa of the first antenna conductor 20a.

The second input/output terminal electrode 21b is connected to the terminal-side land 33Da of the fourth inductance element 33D on the second insulation sheet 31B via a fourth interlayer connection conductor 35D such as the through hole conductor passing through the first insulation sheet 31A. The second input/output terminal electrode 21b is connected to the second input/output terminal 21ba of the second antenna conductor 20b.

As further shown, the RFIC chip 32 is arranged between the first and the second inductance element 33A and 33B and between the third and the fourth inductance element 33B and 33D. The RFIC chip 32 arranged in this manner functions as a shield, to thereby suppress the magnetic-field coupling and capacitive coupling between the first and the second spiral-coil-shaped inductance elements 33A and 33B disposed on the third insulation sheet 31C. Similarly, it suppresses the magnetic-field coupling and the capacitive coupling between the third and the fourth spiral-coil-shaped inductance elements 33C and 33D. Consequently, the passband of communication signals is restrained from becoming narrow.

[Equivalent Circuit of RFIC Element]

Figure 5:
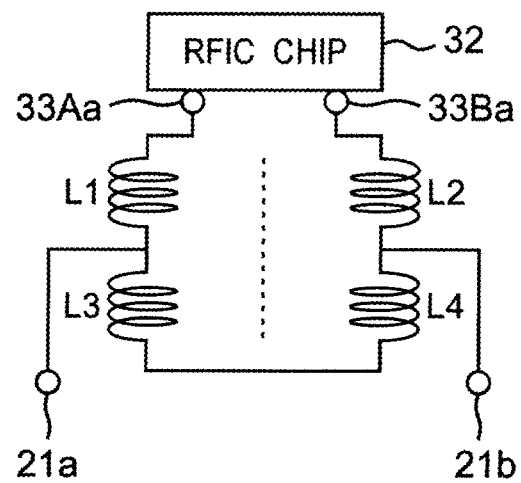
FIG. 5 is a view showing an equivalent circuit of the RFIC element in the packaging paperboard of the first embodiment.

FIG. 5 is a view showing an equivalent circuit of the RFIC element configured as above. In FIG. 5, a first inductor L1 corresponds to the first inductance element 33A. A second inductor L2 corresponds to the second inductance element 33B. A third inductor L3 corresponds to the third inductance element 33C. A fourth inductor L4 corresponds to the fourth inductance element 33D. According to the exemplary aspect, values of the first to the fourth inductors L1, L2, L3 and L4 specify impedance matching characteristics of a power feeding circuit configured from the first to the fourth inductance terminals 33A, 33B, 33C and 33D and the first to the fourth interlayer connection conductors 35A, 35B, 35C and 35D.

One end of the first inductor L1 is connected to the first terminal 32a disposed on the RFIC chip 32. One end of the second inductor L2 is connected to the second terminal 32b disposed on the RFIC chip 32. The other end of the first inductor L1 is connected to one end of the third inductor L3. The other end of the second inductor L2 is connected to one end of the fourth inductor L4. The other end of the third inductor L3 is connected to the other end of the fourth inductor L4. The first input/output terminal electrode 21a is connected to a connection point between the first and the third inductors L1 and L3. The second input/output terminal electrode 21b is connected to a connection point between the second and the fourth inductors L2 and L4.

As seen in the equivalent circuit shown in FIG. 5, the first inductance element 33A, the second inductance element 33B, the third inductance element 33C, and the fourth inductance element 33D are wound to have magnetic fields in phase and are connected in series to each other.

Referring back to FIG. 4, the first inductance element 33A and the third inductance element 33C have substantially the same loop shape and have a same first winding shaft. Similarly, the second inductance element 33B and the fourth inductance element 33D have substantially the same loop shape and have a same second winding shaft. The first winding shaft and the second winding shaft are arranged so as to put the RFIC chip 32 therebetween.

That is, the first inductance element 33A and the third inductance element 33C are coupled magnetically and capacitively. Similarly, the second inductance element 33B and the fourth inductance element 33D are coupled magnetically and capacitively.

[Exemplary Configuration of Packaging Paperboard]

A configuration of the packaging paperboard 10 manufactured by the manufacturing method of the packaging paperboard 10 shown in FIG. 1 will be described.

In manufacture of the packaging paperboard 10 of the first embodiment, the packaging paperboard 10 having an RFID function is manufactured by sticking together two types of paperboards (the first sheet A and the second sheet B) for paper container manufactured in advance. It is noted that the present invention is not limited to manufacturing the packaging paperboard 10 by sticking together two types of paperboards for paper container but is applicable to a manufacturing method in which a manufacturing step of the packaging paperboard 10 with the RFID function is added to a step of manufacturing multi-layered paperboard for paper container, which manufacturing method is encompassed in the present invention.

FIG. 6 is a sectional view showing the packaging paperboard 10 manufactured by the manufacturing method of the packaging paperboard 10 of the first embodiment. The packaging paperboard 10 shown in FIG. 6 represents the first sheet A configured from a front layer A1 and an intermediate layer A2 and the second sheet B configured from a back layer B1. For easy understanding, FIG. 6 shows the state immediately before sticking the first sheet A and the second sheet B together. Moreover, it is noted that the transport direction T of the first sheet A and the second sheet B shown in FIG. 6 is a direction orthogonal to a paper surface.

The front layer A1 of the first sheet A is made of "pulp" and has a surface that is coated to present smoothness for preventing uneven printing. The intermediate layer A2 of the first sheet A is made of "used paper" and functions as a core material of the packaging paperboard 10. Although the second sheet B as the back layer B1 of the packaging paperboard 10 is described with a configuration using the paperboard for paper container, a resin film capable of forming the adhesion layer (a sticky layer) may be used. Although, in the manufacturing method of the packaging paperboard of the first embodiment, as an exemplification, the first sheet A is described to have a laminated configuration of the front layer A1 and the intermediate layer A2 and the second sheet B is described to have a configuration with the back layer B1, the present invention is not limited to such configurations but is applicable to any configuration having at least two layers.

As shown in FIG. 6, the antenna pattern 20 is formed on a surface (i.e., a top surface of the intermediate layer A2 shown in FIG. 6) of the intermediate layer A2 facing the second sheet B and acting as the antenna-pattern-forming surface 100 of the first sheet A. On the other hand, the adhesion layer 22 is formed on a surface (i.e., a bottom surface of the back layer B1 shown in FIG. 6) of the back layer B1 facing the first sheet A and acting as the sticking surface 200 of the second sheet B. The RFIC element 21 is adhered to the adhesion layer 22. As described above, the first input/output terminal electrode 21a and the second input/output terminal electrode 21b of the RFIC element 21 confront respectively the first input/output terminal 20aa and the second input/output terminal 20ba of the antenna pattern 20 and are positioned to ensure secure connections therebetween. At this time, as described above, the first input/output terminal 20aa and the second input/output terminal 20ba of the antenna pattern 20 have such a shape (i.e., the band shape) that the transport direction T of the first sheet A and the second sheet B is the longitudinal direction, so that secure connections between the antenna pattern 20 and the RFIC element 21 are ensured even if the RFIC element 21 of the second sheet B has the misalignment in the transport direction T relative to the antenna pattern 20 of the first sheet A. In the sectional view shown in FIG. 6, the transport direction T is orthogonal to the paper surface and the first input/output terminal 20aa and the second input/output terminal 20ba are extended in the direction T.

Figure 7A:
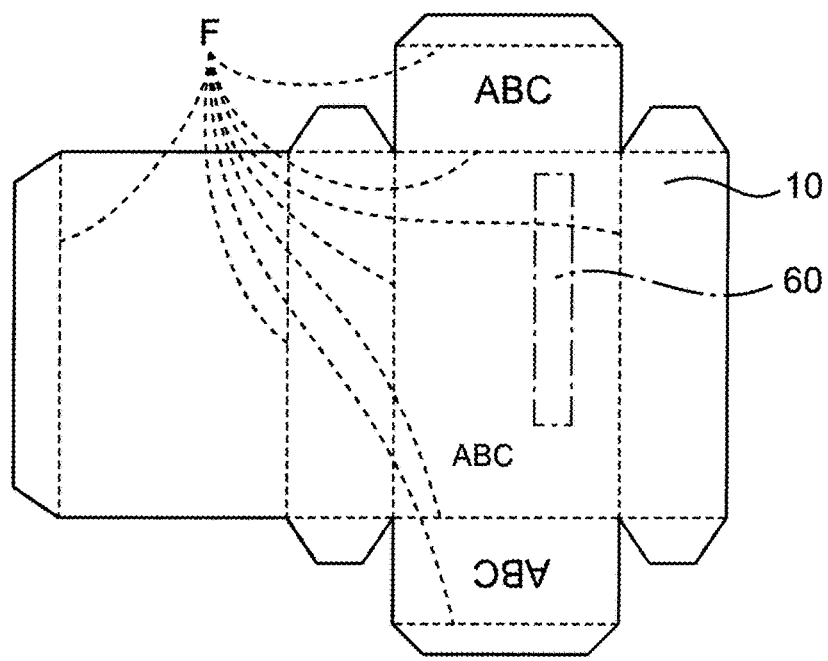
FIG. 7(a) shows a view of the packaging paperboard manufactured by the manufacturing method of the packaging paperboard of the first embodiment.
Figure 7B:
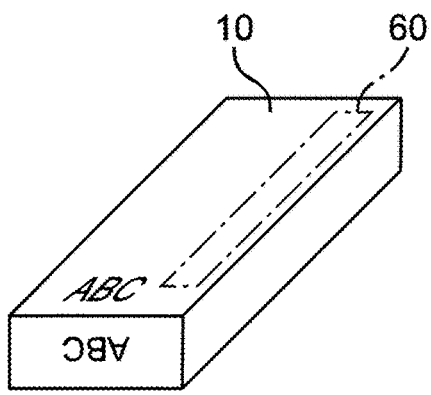
FIG. 7(b) shows a view of the state of the packaging paperboard assembled.

FIG. 7(a) is a view showing the packaging paperboard 10 manufactured by the manufacturing method of the packaging paperboards 10 of the first embodiment, and shows the front surface of the packaging paperboard 10 having, for example, a product name (ABC)printed thereon. In the paperboard 10 shown in FIG. 7(a), broken lines indicate fold lines F of the packaging paperboard 10 to be folded in assembling a box. FIG. 7(b) shows a state where the packaging paperboard 10 shown in FIG. 7(a) is folded and assembled along the fold lines F.

As shown in FIGS. 7(a) and 7(b), the RFIC device 60 having the RFIC function with the antenna pattern 20 and the RFIC element 21 connected is formed on a flat portion without the fold lines F of the packaging paperboard 10. In particular, a vicinity of corner portions of the box is a favorable position to arrange the RFIC device 60 in assembling the box. This is because, even if articles accommodated into the box contain materials influential in communications of the RFIC device 60, the influence the articles have on the RFIC device 60 can be reduced by keeping the RFIC 60 of the box away from the articles by a predetermined distance.

[Exemplary Shapes of Antenna Pattern]

FIGS. 8(a) to 8(d) are views showing various shapes of the antenna pattern 20 manufactured by the manufacturing method of the packaging paperboard 10 of the first embodiment. The antenna patterns 20 shown in FIGS. 8(a) to 8(d) each have elongated band-shaped antenna conductors formed thereon and connected to the RFIC elements 21. As shown in FIGS. 8(a) to 8(d), the antenna pattern 20 may be appropriately shaped depending on the configuration of the packaging paperboard 10 on which the antenna pattern 20 is formed. Even when having such an elongated band shape, the antenna pattern 20 is configured to function as a dipole antenna. In the antenna patterns 20 shown in FIGS. 8(a) to 8(d), an arrow T indicates the transport direction of the first sheet A and the second sheet B in the manufacturing method of the packaging paperboard 10.

Figure 8A:
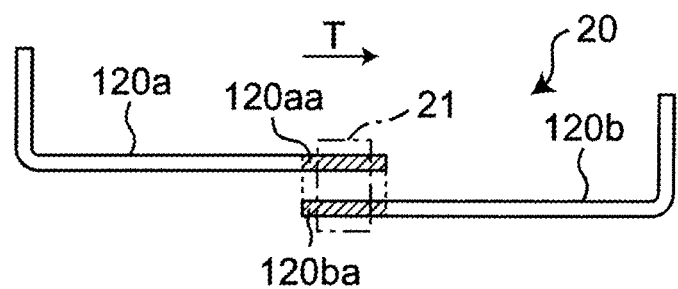
FIGS. 8(a)-(d) illustrate views showing various forms of the antenna pattern manufactured by the manufacturing method of the packaging paperboard of the first embodiment.
Figure 8B:
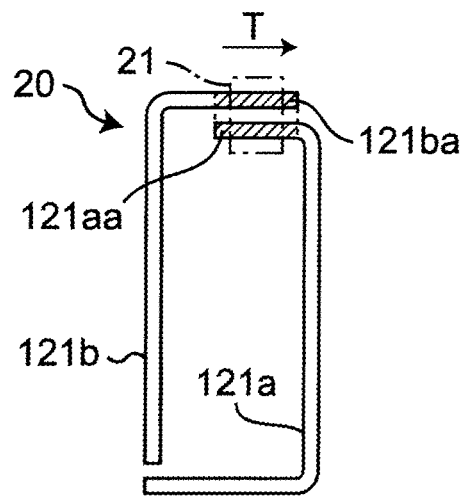
Figure 8C:
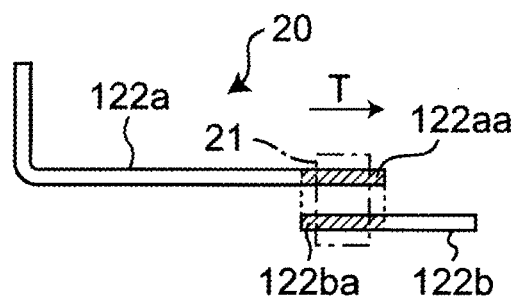
Figure 8D:
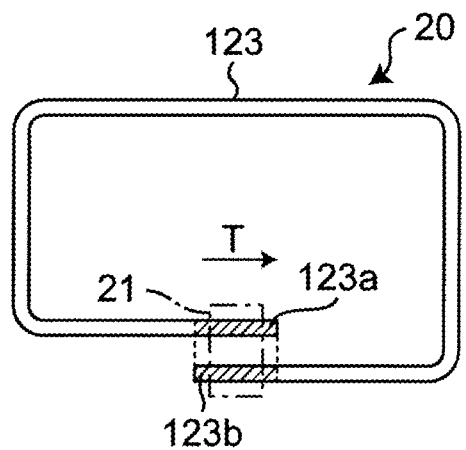

The antenna pattern 20 shown in FIG. 8(a) is connected to the RFIC element 21, extends to be derived from both sides of the RFIC element 21, and has a first antenna conductor 120a and a second antenna conductor 120b. The first antenna conductor 120a and the second antenna conductor 120b are shaped into an elongated band with the same width and the same shape and are bent substantially at a right angle in nearly "L".

In the first antenna conductor 120a and the second antenna conductor 120b, a first input/output terminal 120aa and a second input/output terminal 120ba connectable to the first input/output terminal electrode 21a and the second input/output terminal electrode 21b of the RFIC element 21 are respectively formed integrally. The first input/output terminal 120aa and the second input/output terminal 120ba with an elongated band shape are juxtaposed facing each other at a predetermined interval, whose longitudinal direction is the transport direction T of the manufacturing method of the packaging paperboard 10. That is, the first input/output terminal 120aa and the second input/output terminal 120ba are formed into a shape (e.g., a rectangular shape) having its longitudinal direction parallel to the transport direction T and extend with a predetermined length. In FIG.

8(*a*), regions of the first input/output terminal 120*aa* and the second input/output terminal 120*ba* are indicated by hatched lines.

Since the antenna pattern 20 shown in FIG. 8(*a*) has an elongated configuration in which the first antenna conductor 120*a* and the second antenna conductor 120*b* are derived from both sides of the RFIC element 21, it is preferably used as a package of the packaging paperboard 10 having an elongated and flat region.

The antenna pattern 20 shown in FIG. 8(*b*) has an elongated bent band shape with a first antenna conductor 121*a* and a second antenna conductor 121*b* having the same width. The configuration is such that the bent first antenna conductor 121*a* and the bent second antenna conductor 121*b* form a substantially rectangular frame shape, with the RFIC element 21 being arranged at a corner portion of the substantial rectangle. In the first antenna conductor 121*a* and the second antenna conductor 121*b*, a first input/output terminal 121*aa* and a second input/output terminal 121*ba* connectable to the first input/output terminal electrode 21*a* and the second input/output terminal electrode 21*b* of the RFIC element 21 are respectively formed integrally. The first input/output terminal 121*aa* and the second input/output terminal 121*ba* have an elongated band shape (e.g., a rectangular shape) and are juxtaposed facing each other at a predetermined interval, each extending to a predetermined length with its longitudinal direction parallel to the transport direction T. In FIG. 8(*b*), regions of the first input/output terminal 121*aa* and the second input/output terminal 121*ba* are indicated by hatched lines. The antenna pattern 20 shown in FIG. 8(*b*) can be used in a relatively small package of the packaging paperboard 10 due to the first antenna conductor 121*a* and the second antenna conductor 121*b* formed into a relatively small, substantially rectangular frame.

The antenna pattern 20 shown in FIG. 8(*c*) has an elongated band shape with a first antenna conductor 122*a* and a second antenna conductor 122*b* having the same width and extends to be derived from both sides of the RFIC element 21. The first antenna conductor 122*a* is formed longer compared with the second antenna conductor 122*b* and has a bent shape. On the contrary, the second antenna pattern 122*b* is formed substantially rectilinearly. The first antenna conductor 122*a* and the second antenna conductor 122*b* have a first input/output terminal 122*aa* and a second input/output terminal 122*ba* formed thereon connectable respectively to the first input/output terminal electrode 21*a* and the second input/output terminal electrode 21*b* of the RFIC element 21. The first input/output terminal 122*aa* and the second input/output terminal 122*ba* have elongated band shapes (e.g., the rectangular shapes) juxtaposed facing each other at a predetermined interval and extend to a predetermined length with the longitudinal direction parallel to the transport direction T. In FIG. 8(*c*), regions of the first input/output terminal 122*aa* and the second input/output terminal 122*ba* are indicated by hatched lines. Although, in the antenna pattern 20 shown in FIG. 8(*c*), the first antenna conductor 121*a* and the second antenna conductor 121*b* have different lengths, a desired communication capacity can be fulfilled as long as it is ensured that lengths of the first antenna conductor 121*a* and the second antenna conductor 121*b* have substantially a half-wave length ($\lambda/2$). In a case that desired communication distances are short, the lengths of the first antenna conductor 121*a* and the second antenna conductor 121*b* may be substantially equal to or shorter than the half-wave length ($\lambda/2$).

The antenna pattern 20 shown in FIG. 8(*d*) is in the form of a loop antenna configured from an antenna conductor 123 that is like an elongated band having the same width. At the both ends of the antenna conductor 123 having the looped shape, a first input/output terminal 123*a* and a second input/output terminal 123*b* respectively connectable to the first input/output terminal electrode 21*a* and the second input/output terminal electrode 21*b* of the RFIC element 21 are formed. The first input/output terminal 123*a* and the second input/output terminal 123*b* have elongated band shapes juxtaposed facing each other at a predetermined interval, and extend to a predetermined length with the longitudinal directions parallel to the transport direction T. In FIG. 8(*d*), regions of the first input/output terminal 123*a* and the second input/output terminal 123*b* are indicated by hatched lines. It is noted that a region on which the RFIC device 60 is disposed is small, so the antenna pattern 20 shown in of FIG. 8(*d*) can be used in relatively small packages.

As described above, the antenna pattern 20 formed on the first sheet A in the first embodiment can take various shapes and will do as long as, in an antenna conductor to which the RFIC element 21 of the second sheet B is connected, the first input/output terminal and the second input/output terminal are at least juxtaposed at a predetermined interval and have shapes extended to a predetermined length with longitudinal directions parallel to the transport direction T. If the antenna pattern 20 configured like this is formed on the first sheet A, a configuration is obtained in which the RFIC element 21 of the second sheet B is surely connected to the antenna pattern 20 in the manufacturing method of the packaging paperboard 10.

Figure 9A:
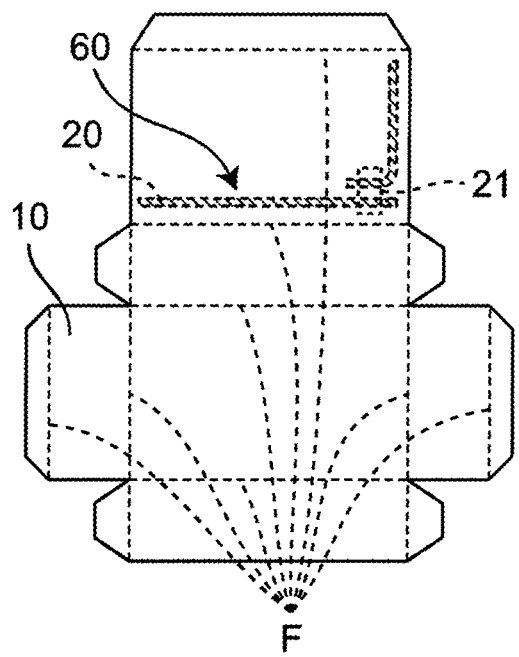
FIGS. 9(a)-(c) illustrate views showing a specific example of the packaging paperboard manufactured by the manufacturing method of the packaging paperboard of the first embodiment.
Figure 9B:
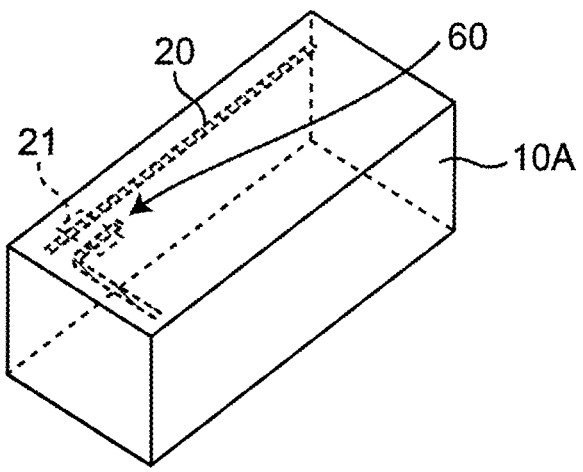
Figure 9C:
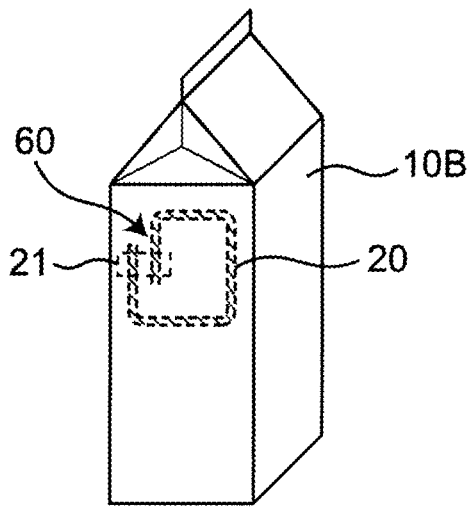

FIGS. 9(*a*) to 9(*c*) are views showing an example of the packaging paperboard 10 manufactured by the manufacturing method of the packaging paperboard 10 of the first embodiment. FIG. 9(*a*) is a view showing a position at which the RFIC device 60 is disposed on the developed packaging paperboard 10. Reference letter F designates fold lines in a development of FIG. 9(*a*). In the packaging paperboard 10 of FIG. 9(*a*), the RFIC device 60 is disposed on one plane not including fold lines F and is disposed in the vicinity of the fold lines F. FIG. 9(*b*) is a perspective view showing a state where the packaging paperboard 10 shown in FIG. 9(*a*) is assembled into a box 10A. 9(*c*) is a view showing the other specific example and is a perspective view showing an example that the RFIC device 60 of the loop antenna is disposed on a milk carton 10B as the box.

As described above, the manufacturing method of the packaging paperboard of the first embodiment enables providing the packaging paperboard with the RFID function having excellent communication properties, as well as manufacturing the packaging paperboard with the RFID function in a simple manner. As a result, each of packages containing products need not have the RFID tag in the form of a separate item and accordingly the package with the RFID function containing articles can be provided at a low cost.

Second Exemplary Embodiment

Hereinafter, a description will be given of a configuration of a packaging paperboard of a second exemplary embodiment according to the present invention. It is noted that the packaging paperboard of the second embodiment is described mainly about differences from the packaging paperboard of the first embodiment. In explaining the second embodiment, the same reference numerals and/or letters are imparted to elements having the same action, configuration, and function as in the first embodiment and will not again be explained to avoid duplicate description.

Figure 10B:
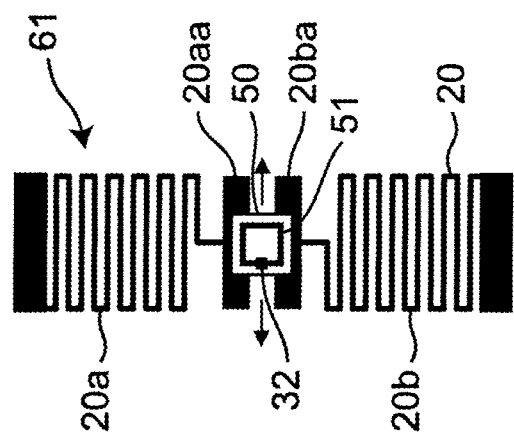
FIGS. 10(a)-(b) illustrate views showing a configuration of the RFIC device in a packaging paperboard of a second embodiment according to the present invention.
Figure 10A:
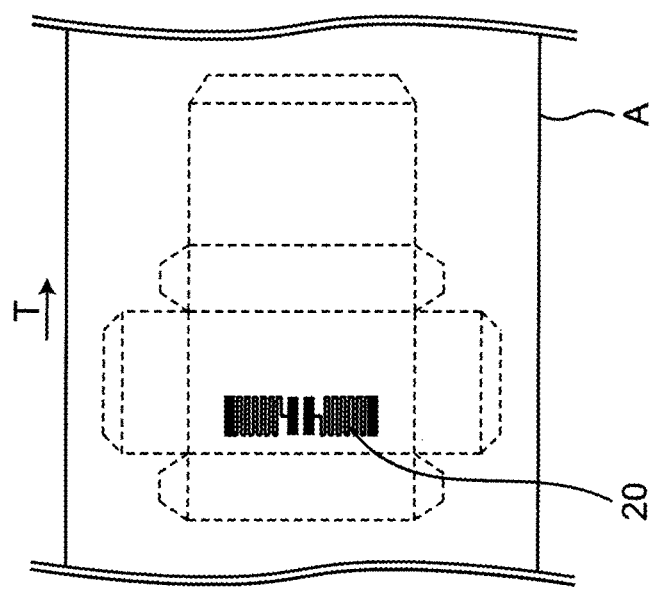

FIGS. 10(a) and 10(b) show configurations of an RFIC device 61 on the packaging paperboard of the second embodiment. FIG. 10(a) represents a state in which the antenna pattern 20 is printed on the first sheet A, as well as a state immediately before sticking to the second sheet B after movement along the transport direction T. FIG. 10(b) is a view showing a state where the RFIC device 61 is formed with the second sheet B stuck to the first sheet A. FIG. 10(b) shows only a planar configuration of the RFIC device 61 with no depictions of the first sheet A and the second sheet B.

The configuration of the packaging paperboard of the second embodiment is different from that of the first embodiment in that a loop conductor 51 is formed on an RFIC element 50 having an RFIC chip 32. In a manufacturing method of the packaging paperboard of the second embodiment, the first sheet A having the antenna pattern 20 printed at a predetermined position and the second sheet B having the RFIC element 50 stuck at a predetermined position are stuck to manufacture a third sheet (i.e., A+B). At this time, the RFIC element 50 of the second sheet B is stuck to the antenna pattern 20 of the first sheet A at a predetermined position so that the RFIC device 61 is disposed on the packaging paperboard.

The RFIC element 50 of the second embodiment has a configuration where the RFIC chip 32 and the loop conductor 51 are formed within its board and has a resonant circuit with resonant frequencies equal to the communication frequencies (e.g., UHF band communication frequencies), the resonant circuit being formed by a capacitance component of the RFIC chip 32 itself and an inductance component of the loop conductor 51.

The manufacturing method of the packaging paperboard of the second embodiment is substantially the same as the manufacturing method of the packaging paperboard of the first embodiment shown in FIG. 1 described above and differs therefrom in using the RFIC element 50 making up the RFIC device 61.

In the manufacturing method of the packaging paperboard of the second embodiment, similarly to the manufacturing method of the packaging paperboard of the first embodiment shown in FIG. 1, the antenna pattern 20 is printed on the first sheet A at the printing step 2 and the sheet is dried at the drying step 3. Meanwhile, the second sheet B has an adhesive applied on at the adhesive applying step 5 and has the RFIC element 50 supplied in sequence and adhered thereto at the RFIC element supplying step 6. In this way, the first sheet A having the antenna pattern 20 formed thereon and the second sheet B having the RFIC element 50 adhered thereto are stuck at the same speed. At this time, the RFIC element 50 of the second sheet B is disposed just above and across the land parts (i.e., the first input/output terminal 20aa, the second input/output terminal 20ba) formed on the antenna pattern 20 of the first sheet A and becomes electrically connected to the antenna pattern 20. Thus, in the manufacturing method of the packaging paperboard of the second embodiment, the first sheet A having the antenna pattern 20 printed at a predetermined position and the second sheet B having the RFIC element 50 adhered at a predetermined position are stuck together over entire surfaces thereof, except regions occupied by the RFIC element 50.

Substantially the entire surfaces of the first sheet A and the second sheet B being stuck together as described above, the loop conductor 51 of the RFIC element 50 and the land parts 20aa, 20ba of the antenna pattern 20 become electrically coupled with each other, with the result that the RFIC element 50 and the antenna pattern 20 become electrically connected to each other.

In the antenna pattern 20 formed on the first sheet A of the second embodiment, similarly to the first embodiment described above, the first input/output terminal 20aa (i.e., the land part) as one end of the first antenna conductor 20a and the second input/output terminal 20ba (i.e., the land part) as one end of the second antenna conductor 20b have an elongated rectangular shape (e.g., a band shape) along the transport direction T where the first sheet A and the second sheet B are stuck together. In this manner, the first input/output terminal 20aa and the second input/output terminal 20ba have a shape (e.g., the band shape) with its longitudinal direction equal to the transport direction T where the first sheet A and the second sheet B are stuck together, so that the RFIC element 50 is surely disposed over the first input/output terminal 20aa and the second input/output terminal 20ba of the antenna pattern 20 even if the RFIC element of the second sheet B has the misalignment in the transport direction T relative to the antenna pattern 20 of the first sheet A.

Although the loop conductor 51 of the RFIC element 50 and the land parts 20aa, 20ba of the antenna pattern 20 become electrically connected to each other, the both are not directly fixed to each other so that, even if the first sheet A and the second sheet B bend, the RFIC element 50 can slide over the land parts 20aa, 20ba of the antenna pattern 20, whereupon the sliding connection portions are not subjected to any stress concentration. Accordingly, in the packaging paperboard manufactured by the manufacturing method of the packaging paperboard of the second embodiment, a highly reliable configuration is obtained in the connection portions between the antenna pattern 20 and the RFIC element 50.

Figure 11:
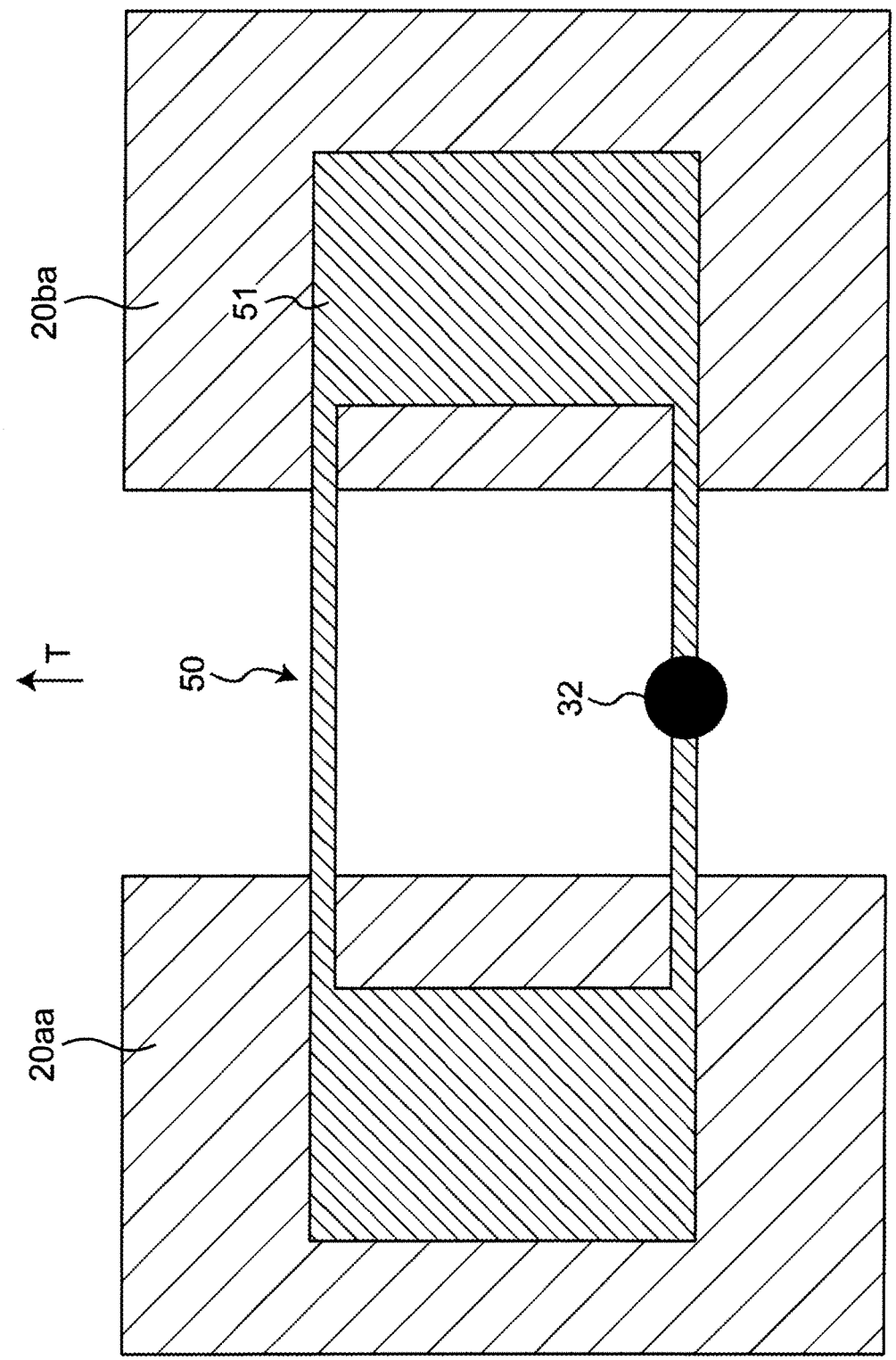
FIG. 11 shows a positional relationship between the RFIC element and the antenna pattern in the packaging paperboard of the second embodiment according to the present invention.

FIG. 11 is a view showing a positional relationship between the loop conductor 51 of the RFIC element 50 and the land parts 20aa, 20ba of the antenna pattern 20. As shown in FIG. 11, the loop conductor 51 of the RFIC element 50 has wide-width electrode portions formed in two locations so that these wide-width electrode portions are respectively securely placed on the land parts (i.e., the first input/output terminal 20aa, the second input/output terminal 20ba, formed on the antenna pattern 20, to achieve secure electrical connections therebetween.

The inductance component has a length (e.g., a line segment) in the transport direction T fixed to the length of the electrode portion on the land parts of the loop conductor 51 and has a length (e.g., a line segment) in the direction orthogonal to the transport direction T fixed between lines across the land parts of the loop conductor 51. Therefore, the inductance component of the loop conductor 51 is fixed to a predetermined value previously set, and even if there is a variation in mounting the RFIC element on the antenna pattern 20, a fluctuation of frequency characteristics as electrical characteristics is prevented in the RFIC device 61.

As described above, the manufacturing method of the packaging paperboard of the second embodiment can provide the packaging paperboard having the RFID function with excellent communication properties and can manufacture the packaging paperboard with the RFID function in a simple manner. As a result, each of packages containing products need not have the RFID tag in the form of a separate item and accordingly the package with the RFID function containing articles can be provided at a low cost.

It is noted that exemplary embodiments are described above, but it is noted that the configurations shown in the different embodiments can partially be permuted or combined. The second embodiment does not refer to common items to the first embodiment but describes different points, and particularly does not refer in turn to the same actions and effects arising from the same configurations.

By combining any exemplary embodiments of the various embodiments described above, the effects which the embodiments offer can be obtained.

Although the present invention presents full descriptions in relation to the preferred embodiments with reference to the accompanying drawings, various variants and modifications are obvious to those skilled in the art. Such variants and modifications should be construed as being encompassed in the scope of the present invention without departing from the scope of the invention defined by the appended claims.

The present invention can provide the packaging paperboard having the RFID function with excellent communication properties, so that it is applicable to various products provided in the form of the paper container, having a high versatility.

EXPLANATIONS OF LETTERS OF NUMERALS 1 first supply reel
2 printing step
3 drying step
4 second supply reel
5 adhesive applying step
6 RFIC element supplying step
7 guide roll
8 pressure roll
9 punching device
10 packaging paperboard
11 storage box
12 gravure roll
13 drying roll
20 antenna pattern
20a first antenna conductor
20aa first input/output terminal
20b second antenna conductor
20ba second input/output terminal
21 RFIC element
21a first input/output terminal electrode
21b second input/output terminal electrode
31 RFIC chip

The invention claimed is:

1. A method for manufacturing a packaging paperboard including at least two paperboard layers, the method comprising:
   printing a plurality of antenna patterns on a same surface of a first paperboard layer of the at least two paperboard layers at a predetermined interval from each other;
   adhering a plurality of RFIC elements to a second paperboard layer of the at least two paperboard layers at a predetermined interval from each other; and
   coupling the first and second paperboard layers together to electrically connect the RFIC elements to the antenna patterns, respectively, such that the RFIC elements and the plurality of antenna patterns are interposed between the first paperboard layer and the second paperboard layer,
   wherein the printing of the plurality of antenna patterns comprises continuously printing the antenna patterns on a first sheet at a predetermined interval, with the first sheet configuring the first paperboard layer and being continuously fed from a first supply reel around which the first sheet is wound.

2. The method for manufacturing a packaging paperboard according to claim 1, wherein the adhering of the RFIC elements includes continuously adhering the plurality of RFIC elements at the predetermined interval on a second sheet coated with an adhesive, with the second sheet configuring the second paperboard layer and being continuously fed from a second supply reel around which the second sheet is wound.

3. The method for manufacturing a packaging paperboard according to claim 2, wherein the electrically connecting of the RFIC elements to the antenna patterns comprises continuously feeding and sticking together the first sheet having the antenna patterns printed thereon to the second sheet having the RFIC elements adhered thereto to electrically connect the RFIC elements to the antenna patterns, respectively.

4. The method of manufacturing a packaging paperboard according to claim 1, wherein the antenna pattern comprises an antenna configured to send and receive radio waves and a land to which the RFIC element is electrically connected.

5. The method of manufacturing a packaging paperboard according to claim 4, wherein the land has a shape with a longitudinal direction parallel to a transport direction in which the first sheet and the second sheet are stuck together.

6. The method of manufacturing a packaging paperboard according to claim 1, further comprising printing the plurality of antenna patterns on the first paperboard layer, with each antenna pattern having first and second antenna conductors with respective lands thereon.

7. The method of manufacturing a packaging paperboard according to claim 6, further comprising coupling first and second input/output terminals of each respective RFIC element to the respective lands of the first and second antenna conductors during the coupling of the first and second paperboard layers.

8. The method of manufacturing a packaging paperboard according to claim 6, further comprising forming the first and second antenna conductors as elongated bands having a same width and a same shape bent substantially at a right angle.

9. The method of manufacturing a packaging paperboard according to claim 6, further comprising forming the lands on the first and second antenna conductors to extend in a direction parallel to a feeding direction of the first and second paperboard layers when the first and second paperboard layers are coupled to each other, such that the respective lands have a predetermined distance therebetween.

10. A packaging paperboard including at least two paperboard layers, comprising:
   an antenna pattern printed on a first paperboard layer of the at least two paperboard layers; and
   an RFIC element directly adhered to a second paperboard layer of the at least two paperboard layers,
   wherein, in a laminate having the first and second paperboard layers stuck together, the RFIC element and the antenna pattern are interposed between the first and second paperboard layers to configure an RFIC device with the RFIC element electrically connected to the antenna pattern, and
   wherein the antenna pattern comprises:
      first and second lands electrically connected to the RFIC element, and
      a first antenna conductor extending from the first land and a second antenna conductor extending from the second land, the first and second antenna conductors being configured to send and receive radio waves, wherein the first land and second land have elongated shapes parallel to and facing each other, and each respective length of the elongated shapes of the first and second lands is larger than a length of the RFIC element, and wherein an end portion of the first land from which the first antenna conductor extends is located on an opposite side in an elongated direction from an end portion of the second land from which the second antenna conductor extends.

11. The packaging paperboard according to claim 10, wherein the first and second antenna conductors are elongated bands having a same width and a same shape bent substantially at a right angle.

12. The packaging paperboard according to claim 10, wherein the lands on the first and second antenna conductors extend in a direction parallel to a longitudinal direction of the first and second paperboard layers, such that the first and second lands have a predetermined distance therebetween.

13. A package assembled with a plurality of fold parts for containing articles, the comprising the packaging paperboard according to claim 10.

14. The package according to claim 13, wherein the RFIC device configured from the RFIC element and the antenna pattern is disposed on a surface that does not include the plurality of fold parts and is disposed adjacent to at least one of the plurality of fold parts from which contained articles are apart by a predetermined distance.

* * * * *